US 009416565B2

(12) United States Patent
Papanikolaou et al.

(10) Patent No.: US 9,416,565 B2
(45) Date of Patent: Aug. 16, 2016

(54) PIEZO BASED ENERGY HARVESTING FOR E-LATCH SYSTEMS

(71) Applicant: Ford Global Technologies, LLC, Dearborn, MI (US)

(72) Inventors: Kosta Papanikolaou, Huntington Woods, MI (US); Rajesh K Patel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 14/086,582

(22) Filed: Nov. 21, 2013

(65) Prior Publication Data

US 2015/0137531 A1    May 21, 2015

(51) Int. Cl.
*E05C 3/06*    (2006.01)
*E05B 81/04*    (2014.01)
*E05B 81/76*    (2014.01)
*E05B 81/84*    (2014.01)
*E05B 77/28*    (2014.01)
*E05B 81/14*    (2014.01)

(52) U.S. Cl.
CPC ............... *E05B 81/04* (2013.01); *E05B 77/28* (2013.01); *E05B 81/14* (2013.01); *E05B 81/76* (2013.01); *E05B 81/84* (2013.01); *Y10T 292/1082* (2015.04)

(58) Field of Classification Search
CPC ............... E05B 81/14; E05B 47/0011; E05B 2047/0062; H02N 2/18; H02N 2/186; H01H 2239/076; H03K 17/964; H03K 17/962; E05Y 2400/616; G01L 1/16; Y10T 29/42
USPC .......................................................... 292/201
See application file for complete search history.

(56) References Cited

U.S. PATENT DOCUMENTS

| | | | |
|---|---|---|---|
| 4,912,460 A | * | 3/1990 | Chu ................... G07C 9/00658 310/330 |
| 5,497,641 A | | 3/1996 | Linde et al. |
| 5,896,026 A | | 4/1999 | Higgins |
| 6,038,895 A | | 3/2000 | Menke et al. |
| 6,740,834 B2 | | 5/2004 | Sueyoshi et al. |
| 6,933,655 B2 | | 8/2005 | Morrison et al. |
| 7,145,436 B2 | | 12/2006 | Ichikawa et al. |
| 7,791,218 B2 | | 9/2010 | Mekky et al. |
| 8,454,062 B2 | | 6/2013 | Rohlfing et al. |
| 2003/0139155 A1 | | 7/2003 | Sakai |
| 2008/0054649 A1 | * | 3/2008 | Ueda ........................ E05B 81/78 292/216 |
| 2009/0021112 A1 | * | 1/2009 | Kondou ................... E05B 81/78 310/319 |
| 2011/0148575 A1 | * | 6/2011 | Sobecki ................ E05B 85/107 340/5.64 |
| 2011/0252845 A1 | | 10/2011 | Webb et al. |
| 2012/0126551 A1 | * | 5/2012 | Alexander .......... E05B 47/0009 292/226 |
| 2013/0127180 A1 | | 5/2013 | Heberer et al. |

* cited by examiner

*Primary Examiner* — Mark Williams
(74) *Attorney, Agent, or Firm* — Jason C. Rogers; Price Heneveld LLP

(57) ABSTRACT

A vehicle door includes an electrically-powered latch and a user input feature that can be actuated by a user to cause the electrically-powered latch to unlatch. An electrical energy storage device is operably connected to the electrically-powered latch, and a piezoelectric device is mounted to the door. The piezoelectric device can be manually actuated by a user to charge the electrical energy storage device, and electrical energy from the electrical energy storage device can be utilized to actuate the electrically-powered latch to thereby unlatch the latch. The user input feature may comprise a switch or sensor located adjacent a door handle/latch release on an inside and/or an outside of the vehicle door. The electrical energy storage device may comprise an emergency battery, capacitor, or other electrical device.

20 Claims, 3 Drawing Sheets

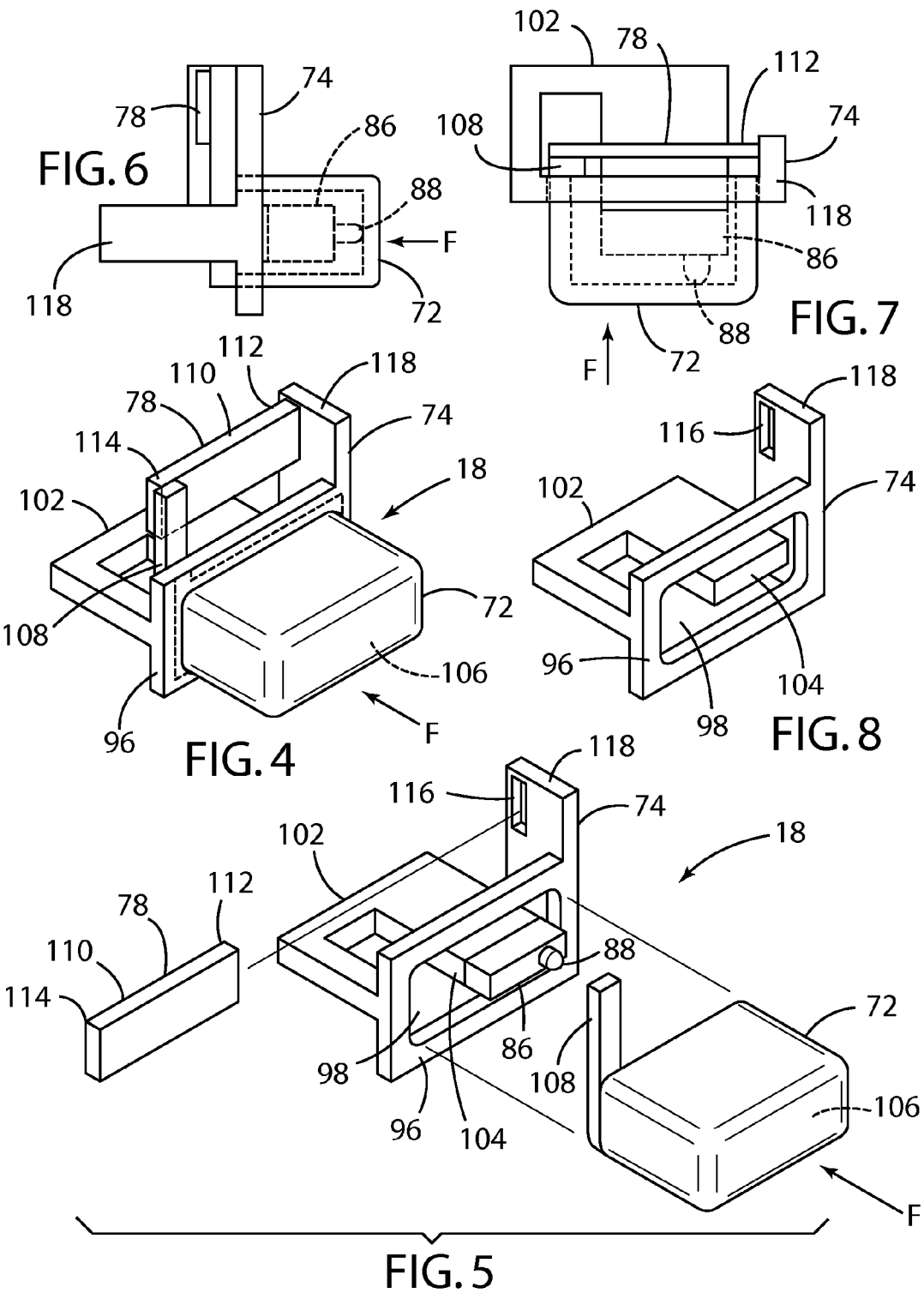

PIEZO BASED ENERGY HARVESTING FOR E-LATCH SYSTEMS

FIELD OF THE INVENTION

The present invention generally relates to powered latch releases for vehicle doors, hatches, hoods, and the like.

BACKGROUND OF THE INVENTION

Various types of powered door latch systems have been developed. An example of one such arrangement is disclosed in U.S. Pat. No. 9,260,882, entitled "UNIVERSAL GLOBAL LATCH SYSTEM," issued on f, the entire contents of which are hereby incorporated by reference. Powered door latches may include a powered actuator that shifts the pawl of the latch to thereby shift the latch to an unlatched state. Once the pawl is in the released position, the latch retaining member (or "catch") can be rotated such that the vehicle door can be opened. Powered latch systems may also include an electrical switch or other unlatch input device at the exterior door handle and/or the interior door handle. In use, a user actuates the switch, thereby generating a signal that is received by a controller. The controller evaluates the signal and generates a signal that causes the powered actuator to shift the pawl to a released position if predefined door unlatch criteria are met, thereby unlatching the powered latch.

Powered latches may utilize a solenoid, electric motor, or other suitable electrically-powered actuator to shift the pawl. The electrically powered actuators are typically powered utilizing the vehicle's main electrical power supply (e.g. a battery). However, electrical energy storage devices such as batteries, capacitors, etc. tend to lose their electrical charge over a period of time. Also, in the event of a malfunction, the vehicle's main electrical power supply may be lost. In the event electrical power is lost, it may not be possible to actuate an electrically-powered latch device.

SUMMARY OF THE INVENTION

One aspect of the present invention is a vehicle door including an electrically-powered latch defining latched and unlatched configurations. The system includes a user input feature that can be actuated by a user to cause the electrically-powered latch assembly to change from the latched state or configuration to the unlatched state or configuration. When the latch is in the unlatched configuration, the door can be opened upon application of a force to the door by a user. The system includes an electrical energy storage device that is operably connected to the electrically-powered latch, and a piezoelectric device. The piezoelectric device is operably connected to the electrical energy storage device such that the piezoelectric device can be manually actuated by a user to charge the electrical energy storage device. Electrical energy from the electrical energy storage device can be utilized to actuate the electrically-powered latch to thereby unlatch the latch assembly. The user input feature may comprise a switch or sensor mounted on or adjacent an interior door handle/latch release, or it may comprise a switch or sensor positioned on or adjacent an exterior door handle. The electrical energy storage device may comprise an emergency battery, capacitor, or other electrical device capable of storing sufficient electrical energy to power the electrically-powered latch. The piezoelectric device may include a bendable beam element or member that generates electrical energy as the beam flexes/bends. The switch may be configured such that a user can simultaneously actuate the switch and bend the piezoelectric element.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1;

FIG. 4 is an isometric view of an interior latch release including a piezoelectric device;

FIG. 5 is an exploded perspective view of the assembly of FIG. 4;

FIG. 6 is a side view of the assembly of FIG. 4;

FIG. 7 is a top plan view of the assembly of FIG. 4; and

FIG. 8 is an isometric view of a base/bezel of the assembly of FIG. 4.

DETAILED DESCRIPTION OF THE PREFERRED EMBODIMENTS

Figure 1:
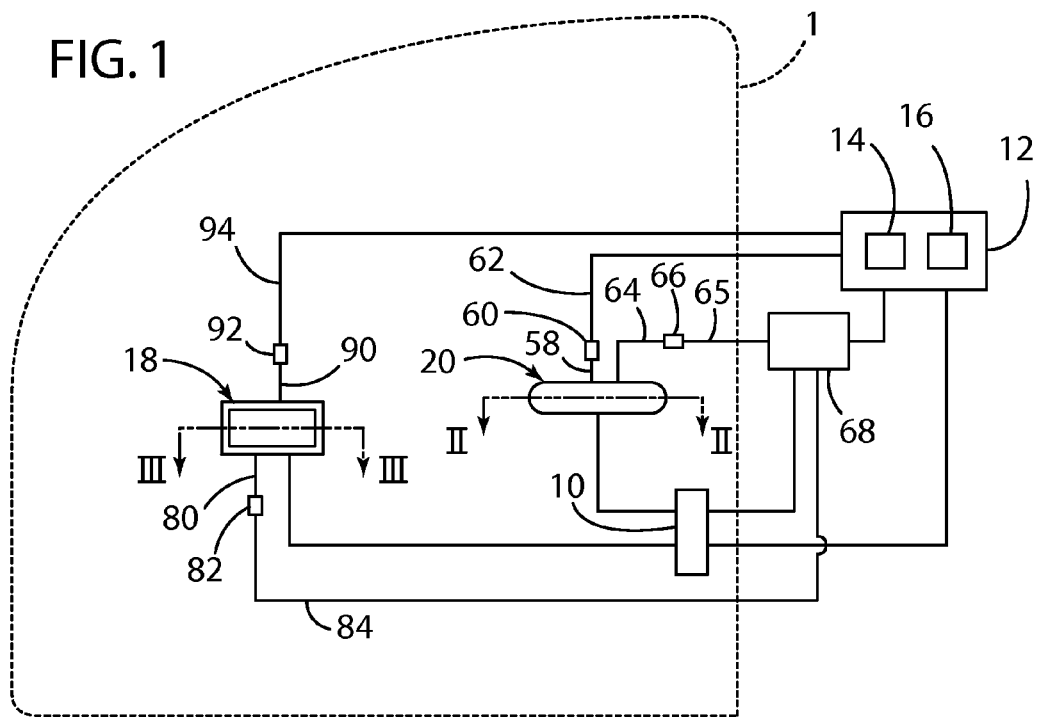
FIG. 1 is a partially schematic view of a door having one or more piezoelectric devices that provide electrical power to actuate an electrically powered latch device.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle door 1 includes a powered latch device 10 that is operably connected to a power/control unit or system 12 of a motor vehicle. The power/control system 12 may include a controller 14 and an electrical power supply such as a battery 16. The door 1 also includes an inside release/handle assembly 18, and an outside release/handle assembly 20. The inside handle assembly 18 and outside handle assembly 20 are both operably connected to the power/control system 12.

As described in more detail in co-pending U.S. Pat. No. 9,260,882, powered latch 10 may include a movable catch member and a pawl that selectively engages the catch member to retain the catch member in a closed position. When the door 1 cannot be opened if the powered latch 10 is in a latched configuration or state. A powered actuator such as an electric motor or solenoid can be utilized to shift the pawl between an engaged position wherein the powered latch 10 remains in the latched position, and a released positioned wherein the powered latch 10 is in an unlatched configuration.

Figure 2:
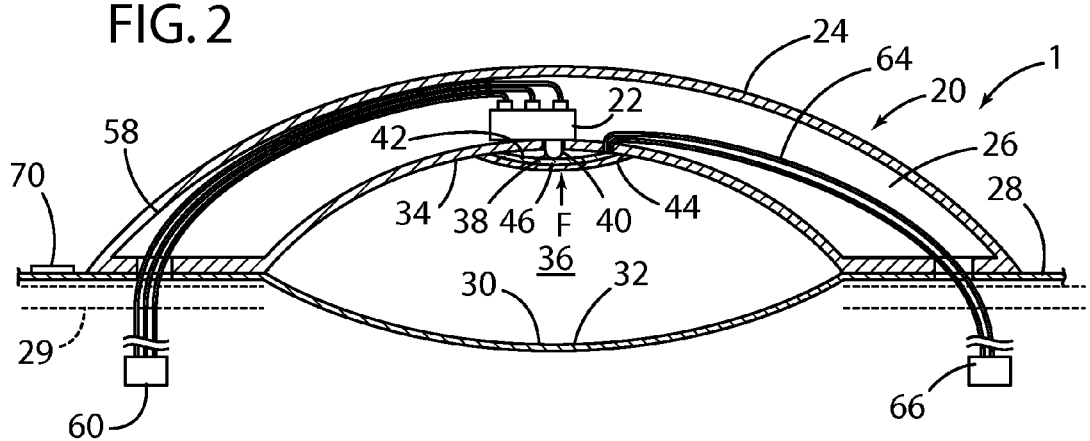
FIG. 2 is a partially fragmentary cross sectional view taken along the line II-II, FIG. 1.

With further reference to FIG. 2, outside handle assembly 20 includes a handle member 24 having a generally tubular construction forming an interior space 26. The handle member 24 is mounted to outer layer or skin 28 and/or inner door structure 29 of door 1. The door skin 28 may include a recessed area 30 having an outer surface 32 that generally faces an inner surface 34 of handle member 24. In use, a user's hand can be inserted into the space 36 defined between the outer surface 32 of skin 28 and inner surface 34 of handle member 24.

Figure 2A:
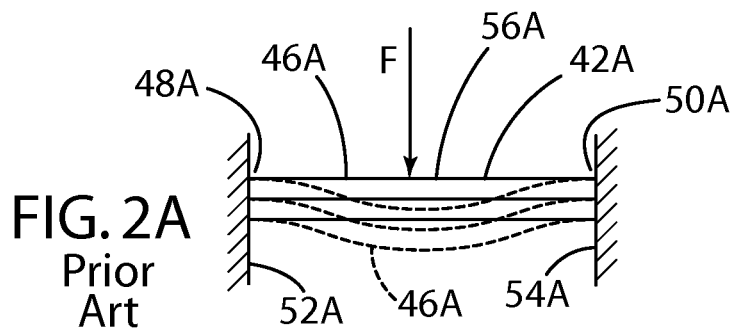
FIG. 2A is a schematic view of a piezoelectric device having a bendable beam element having opposite ends that are rigidly fixed.
Figure 2B:
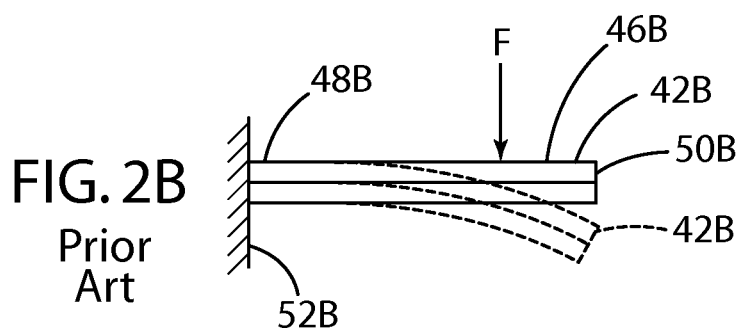
FIG. 2B is a schematic view of a piezoelectric device having a bendable beam element having a first end that is fixed to a rigid support, and a second end that is not constrained.

A user input feature such as a switch 22 is mounted to the handle member 24. The switch 22 includes a movable switch member such as plunger 38 which extends through an opening 40 in handle member 24. A piezoelectric device 42 is mounted to the handle member 24, and an elastomeric membrane 44 extends over the piezoelectric device 42. The piezoelectric device 42 may comprise a beam-type piezoelectric device 42A (FIG. 2A) or a beam-type device 42B (FIG. 2B). Device 42A includes a bendable element 46A having first and second ends 48A and 50A that are rigidly fixed to bases 52A and 54A, respectively. Application of a force "F" to a central portion 56A of bendable element 46A causes the bendable element 46A to flex and thereby generate electricity in a known manner. Alternatively, with reference to FIG. 2B the piezoelectric device 42 may comprise a cantilevered piezoelectric device having a bendable element 46B having a first end 48B that is fixed to a support or base 52B. Application of a force "F" causes the bendable element 46B to bend, thereby generating electricity in a known manner. Suitable piezoelectric devices as shown in FIGS. 2A and 2B are commercially available, and the details of the piezoelectric device are therefore not described in detail herein. It will be understood that the piezoelectric device 42 is shown schematically in FIG. 2, and the specific mounting structures (e.g. bases 52A, 52B and/or 54A) are not shown in detail.

Referring again to FIG. 2, wires or lines 58 are operably connected to the switch 22. A connector such as plug 60 may be utilized to operably connect the lines 58 to lines 62 (FIG. 1) to thereby operably connect the switch 22 to the controller 14. Lines 64 are connected to piezoelectric device 42, and include a connector such as plug 66 (FIG. 1) that connects to lines 65 to thereby operably connect the piezoelectric device 42 to a backup electrical energy storage device 68 (FIG. 1). The backup electrical energy storage device 68 may comprise a battery, capacitor, or other suitable device capable of storing sufficient electrical energy to actuate the powered latch 10.

If the main power supply or battery 16 (FIG. 1) is functioning properly, a user can open the door 1 from the outside by pressing on membrane 44 (FIG. 2) to thereby move the movable switch member 38 of switch 22 to thereby generate a signal to the controller 14 (FIG. 1). The controller 14 then generates a signal causing the powered latch 10 to actuate and shift to an unlatched state or condition utilizing electrical power from battery 16. Controller 14 may be programmed to generate a signal to unlatch the powered latch 10 only if certain predefined criteria are met. For example, controller 14 may cause powered latch 10 to unlatch only if the controller 14 receives a signal from switch 22 and also receives an authorization signal from a remote security device (not shown) such as a fob or the like to thereby prevent unauthorized entry.

In the event the main battery 16 of the vehicle loses its charge or is otherwise unable to supply power to actuate the powered latch 10, a user can actuate the piezoelectric device 42 to generate electricity that is transferred to the backup electrical energy storage device 68. Controller 14 may be configured to detect the charge/electrical power available from main power supply 16 and backup electrical energy storage device 68. As shown in FIG. 2, the bendable element 46 of the piezoelectric device 42 preferably overlies the movable switch member 38, such that application of a force F to membrane 44 by a user will simultaneously flex the bendable element 46 and actuate the switch 22 by movement of movable switch member 38. If the main vehicle power 16 has failed, a user can repeatedly push on the membrane 44 to flex the bendable piezoelectric element 46 a number of times as required to charge the backup electrical energy storage device 68. The door 1 may include one or more indicators 70 positioned on the handle member 24 or adjacent the handle 24 in a position that is visible to a user standing directly adjacent the door 1. For example, indicators 70 may be located in door trim or the like (not shown) or on the exterior of door 1 or on other exterior vehicle surfaces. The indicator 70 may comprise one or more LEDs or the like that are operably connected to controller 14. Controller 14 may be configured to cause indicator 70 to flash or otherwise provide a signal to the user indicating that the main battery 16 is not supplying adequate electrical power, such that manual charging is required. During operation, repeated flexing of bendable piezoelectric element 46 by the user eventually charges the backup electrical energy storage device 68 sufficiently to actuate the powered latch 10. Once the controller 14 determines that backup electrical energy storage device 68 has sufficient electrical energy, controller 14 generates a signal causing the powered latch to unlatch powered latch 10 upon actuation of switch 22.

In the illustrated example, approximately 1 Joule (J) of energy is required to actuate electrically powered latch 10. Commercially available piezoelectric devices (FIGS. 2A and 2B) are capable of generating about 0.055 J of energy per activation. Thus, fewer than 20 activations of the piezoelectric device 42 are typically required to charge backup electrical energy storage device 42.

Figure 3:
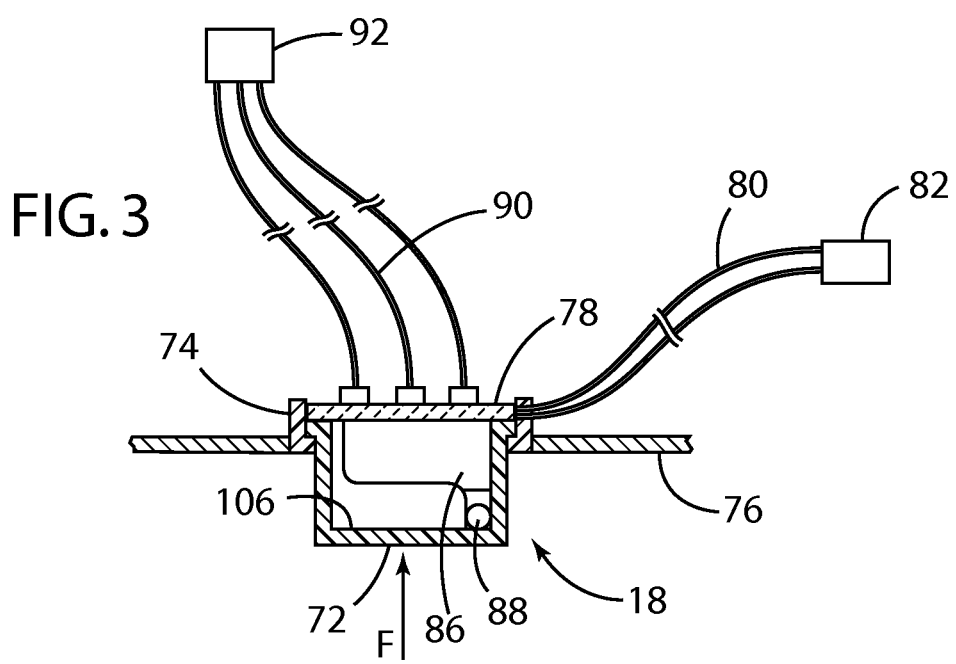
FIG. 3 is a partially fragmentary cross sectional view taken along the line III-III.

With further reference to FIG. 3, the inside release or handle assembly 18 includes an actuating member 72 that is movably supported by a bezel or base 74. The bezel or base 74 is mounted to an interior door structure 76. As discussed in more detail below, a piezoelectric device 78 is mounted to the base 74, such that movement of actuating member 72 causes piezoelectric device 78 to generate electricity. The electricity is transferred through electrical lines 80, connector 82, and lines 84 (see also FIG. 1) to the backup electrical energy storage device 68. Movement of actuating member 72 also causes movement of movable switch member 88 of switch 86. Switch 86 is operably connected to controller 14 by lines 90, connector 92, and lines 94 (see also FIG. 1).

With further reference to FIGS. 4-8, base 74 includes a frame portion 96 with an opening 98 that movably receives the actuating member 72. The base 74 also includes an inner support structure 102 having an end portion 104. The switch 86 is mounted to the end portion 104 of inner support structure 102 when assembled such that inner surface 106 (see also FIG. 3) of actuating member 72 is disposed directly adjacent movable switch member 88 of switch 86.

The piezoelectric device 78 includes a flexible piezoelectric beam element 110 having a first end 112 that is received in a cavity 116 of support structure 118 of base 74 to thereby fix the first end 112 of flexible piezoelectric beam element 110 to the base 74. Piezoelectric device 78 may be substantially similar to device 42B (FIG. 2B). When assembled, the outer or second end 114 of flexible piezoelectric beam element 110 is positioned directly adjacent an extension 108 of actuating member 72. In use, a user applies a force "F" on actuating member 72, thereby shifting the actuating member 72 inwardly in the direction of the arrow "F." As the actuating member 72 moves inwardly, inner surface 106 of actuating member 72 causes movable switch member 88 of switch 86 to move, and also causes extension 108 of actuating member 72 to push against end 114 of flexible piezoelectric beam element 110. As actuating member 72 moves inwardly, it therefore flexes piezoelectric beam element 110, causing piezoelectric device 78 to generate electricity, while simultaneously actuating switch 86.

Piezoelectric device 78 may also comprise a device 42A (FIG. 2A) wherein both ends of the beam element are fixed. In this case, base 74 includes a second support structure 118 (now shown) to fixedly support end 114 of beam element 110, and extension 108 of actuating member 72 is positioned adjacent a center portion of beam element 110.

In the event the main battery supply 16 is inoperative, the inside release assembly 18 can be utilized to generate electrical energy that is temporarily stored in backup electrical energy storage device 68 to thereby provide for powered actuation of powered latch 10. Specifically, if the main battery supply 16 is inoperative, a user can apply a force F to actuating member 72 to thereby shift the actuating member 72 in the direction of the arrow F. Movement of actuating member 72 shifts the moveable switch member 88 of switch 86, and also flexes piezoelectric beam element 110 of piezoelectric device 78. A user can press the actuating member 72 repeatedly until backup electrical energy storage device 68 has sufficient electrical power to actuate the electrically-powered latch 10. In general, the piezoelectric device 78 may be configured such that 20 or fewer actuations by a user are required to generate sufficient electrical energy to actuate the electrically-powered latch 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door, comprising:
an electrically-powered latch defining latched and unlatched states;
a user input feature comprising a switch having a movable switch member actuated by a user and causing the electrically-powered latch assembly to change from the latched state to the unlatched state in order to unlatch the door;
an electrical energy storage device that is operably connected to the electrically-powered latch;
a piezoelectric device having a bendable piezoelectric element operably connected to the electrical energy storage device such that the piezoelectric device is manually actuated by a user to charge the electrical energy storage device; and wherein the bendable elements is positioned directly adjacent the movable switch member:
electrical energy from the electrical energy storage device is utilized to actuate the electrically-powered latch to thereby unlatch the electronically-powered latch.

2. The vehicle door of claim 1, wherein:
the switch is mounted to the vehicle door.

3. The vehicle door of claim 2, wherein:
the switch is mounted on the exterior side of the door.

4. The vehicle door of claim 3, wherein:
the door has an exterior surface portion, the door including a handle on the exterior side of the door with an inner side facing the exterior surface portion; and
the piezoelectric device is mounted on the inner side of the handle.

5. The vehicle door of claim 4, wherein:
the bendable piezoelectric elements generates electrical energy upon bending, whereby the bendable piezoelectric element contacts the movable switch member and actuates the switch upon bending of the bendable piezoelectric element.

6. The vehicle door of claim 5, including:
an interior latch release including an interior piezoelectric device that can be manually actuated by a user from inside the vehicle to generate electrical power to actuate the electrically-powered latch to unlatch the door, and an interior switch that can be actuated from inside the vehicle to unlatch the electrically-powered latch.

7. The vehicle door of claim 1 including:
an actuating member movably mounted to the interior side of the vehicle door; and wherein:
the user input feature comprises a switch mounted on the interior side of the door;
the piezoelectric device is configured to be manually actuated by movement of the actuating member.

8. The vehicle door of claim 7, wherein:
the switch includes a movable switch member;
the piezoelectric device includes a bendable element that generates electrical energy upon bending.

9. The vehicle door of claim 8, including:
a base mounted to the interior side of the vehicle door; and wherein:
the actuating member movably engages the base;
the bendable element comprises a piezoelectric beam having a first end that is fixed to the base; and
upon movement of the actuating member, the actuating member engages and bends the bendable element and also engages and moves the movable switch member.

10. A device for unlatching a vehicle door having an electrically-powered latch, the device comprising:
a base;
a piezoelectric device having a bendable piezoelectric element with a first end fixed to the base and a portion that moves relative to the first end upon bending of the bendable piezoelectric element;
a switch having a movable switch member, wherein movement of the movable switch member generates an unlatch signal to unlatch an electrically-powered latch; and wherein:
the piezoelectric device is configured to generate electrical power that is utilized to power the electrically-powered latch; and wherein the bendable piezoelectric element is disposed directly adjacent the movable switch.

11. The device of claim 10, wherein:
the bendable piezoelectric element includes a second end that moves relative to the base.

12. The device of claim 10, wherein:
the device includes an exterior door handle having an inside surface that faces an exterior surface of a door when the handle is installed on a vehicle door; and wherein:
the switch and the piezoelectric device are disposed on the inside surface of the handle.

13. The device of claim 12, wherein:
the bendable piezoelectric element engages and moves the movable switch member upon bending of the bendable piezoelectric element.

14. A vehicle door including the latch device of claim 10, wherein:
the vehicle door defines an exterior side and an interior side, and wherein the movable switch member is disposed on the interior side of the vehicle door.

15. The vehicle door of claim 14, wherein:
the vehicle door includes a base;
the bendable piezoelectric element is mounted to the base;
the vehicle door includes a movable actuating member that movably engages the base, and wherein the movable actuating member is configured to operably engage the movable switch member and the bendable piezoelectric element whereby a user can manually move the movable actuating member and move the movable switch member and bend the bendable piezoelectric element.

16. A vehicle door comprising:
an electrically-powered latch;
a controller;
a movable switch;
primary and secondary batteries;
a bendable piezoelectric element positioned directly adjacent the movable switch;
an actuating member that simultaneously engages the switch and the piezoelectric element and bends a free end of the piezoelectric element to generate electrical energy that charges the secondary battery, whereby the controller unlatches the electrically-powered latch in response to the movable switch being actuated.

17. The vehicle door of claim 16, wherein:
the vehicle door defines an outer side and an inner side;
the switch and the bendable piezoelectric element are disposed on the inner side of the vehicle door.

18. The vehicle door of claim 17, wherein:
the vehicle door includes a base and an actuating member movably engaging the base for reciprocating movement whereby reciprocating movement of the actuating member actuates the switch and bends the bendable piezoelectric element.

19. The vehicle door of claim 18, wherein:
the bendable piezoelectric element has a first end that is rigidly mounted to the base, and a second end that is substantially free, and wherein the actuating member engages the bendable piezoelectric element adjacent the second end.

20. The vehicle door of claim 16, wherein:
the controller is operably connected to the switch, the primary and secondary batteries, the electrically-powered latch, and the bendable piezoelectric element, and wherein:
the vehicle door includes an illuminated indicator adjacent the actuating member, and wherein the controller causes the illuminated indicator to generate a visible signal if the bendable piezoelectric element needs to be actuated to charge the secondary battery due to a failure of the primary battery.

\* \* \* \* \*